UNITED STATES PATENT OFFICE.

FRIEDRICH STOLZ AND GEORG KORNDÖRFER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY

ALKAMIN ESTER.

No. 828,070.  Specification of Letters Patent.  Patented Aug. 7, 1906.

Application filed November 29, 1905. Serial No. 289,633.

*To all whom it may concern:*

Be it known that we, FRIEDRICH STOLZ, Ph. D., and GEORG KORNDÖRFER, Ph. D., chemists, citizens of the Empire of Germany, residing at Höchst-on-the-Main, Germany, have invented new Pharmaceutical Products; and we hereby declare the following to be a specification thereof.

According to our researches the new substances—namely, the alkamin esters of ortho-aminobenzoic acid—may be obtained, for instance, by reducing the alkamin esters of ortho-nitrobenzoic acid.

The alkamin esters of ortho-aminobenzoic acid are colorless compounds, little soluble in water, of a low melting-point, readily soluble in alcohol, ether, and benzene, and of alkaline reaction on litmus. The said esters form salts readily soluble in water to a neutral solution. On heating with acids or alkalies the alkamin esters of ortho-aminobenzoic acid are decomposed with formation of ortho-aminobenzoic acid and alkamin. These esters have the property of producing local anæsthesia, and this property is in their neutral reacting hydrochlorids not associated with any irritating effect.

The process of preparing the said new esters of alkamins may be carried out, for instance, as follows: Ten parts, by weight, of ortho-nitrobenzoyldiethylaminoethanol, being an oil soluble with difficulty in water and which may be obtained by heating one part of diethylaminoethanol with two parts of ortho-nitrobenzoylchlorid in presence of four parts of benzene are reduced at a moderate temperature with thirteen parts, by weight, of tin and twenty-five parts, by weight, of concentrated hydrochloric acid. From the colorless solution thus obtained the tin is eliminated by means of hydrogen sulfid, and then on addition of potassium carbonate in excess the ortho-aminobenzoyldiethylaminoethanol is separated as an oil, which may be shaken out with ether. If the ethereal solution is evaporated, the new ester remains as an oil which solidifies only if kept at a low temperature for a considerable time. It is soluble in water with difficulty, but is easily soluble in ether, alcohol, and benzene. By heating with alkalies or acids the ester is decomposed while regenerating ortho-aminobenzoic acid simultaneously with idethylaminoethanol. With one equivalent of hydrochloric acid the ester yields a hydrochlorid readily soluble in water to a neutral reaction and crystallizing from alcohol in colorless crystals melting at 125° to 127° centigrade.

In an analogous or different manner other alkamin esters of ortho-aminobenzoic acid may be obtained having the above-mentioned general characteristics.

Having now described our invention, what we claim is—

1. As new products, the alkamin esters of ortho-aminobenzoic acid, being colorless compounds, little soluble in water, but readily soluble in alcohol, ether and benzene, of alkaline reaction on litmus, decomposed when heated with acids or alkalies with formation of ortho-aminobenzoic acid and an alkamin, forming hydrochlorids soluble in water to a neutral solution which produces local anæsthesia without causing any irritation.

2. As a new product, the alkamin ester ortho-aminobenzoyldiethylaminoethanol, being a colorless compound little soluble in water, very readily soluble in alcohol, ether and benzene, solidifying with difficulty in the cold and of alkaline reaction on litmus, when heated with hydrochloric acid or soda-lye it is decomposed into ortho-aminobenzoic acid and diethylaminoethanol and it forms a neutral reacting salt with one equivalent of hydrochloric acid which crystallizes from absolute alcohol in needles melting at 125° to 127° centigrade, the solution of which is of anæsthetic action without causing irritation.

In testimony that we claim the foregoing as our invention we have signed our names in presence of two subscribing witnesses.

FRIEDRICH STOLZ.
GEORG KORNDÖRFER.

Witnesses:
JEAN GRUND,
CARL GRUND.